June 14, 1927.  1,632,451
E. PITCHER
QUACK GRASS DIGGER
Filed Dec. 26, 1925     3 Sheets-Sheet 1
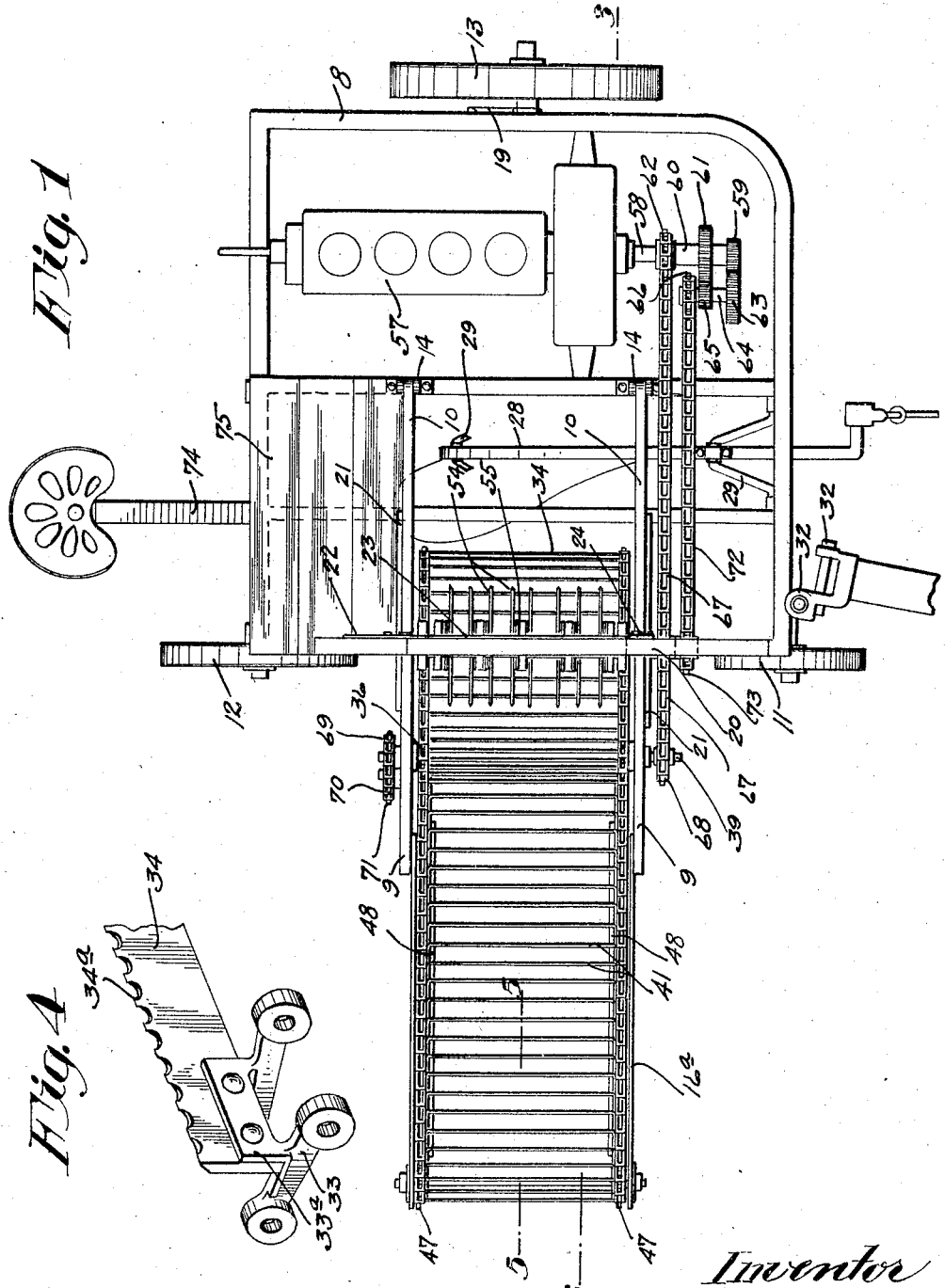
Inventor
Elmer Pitcher
By his Attorneys

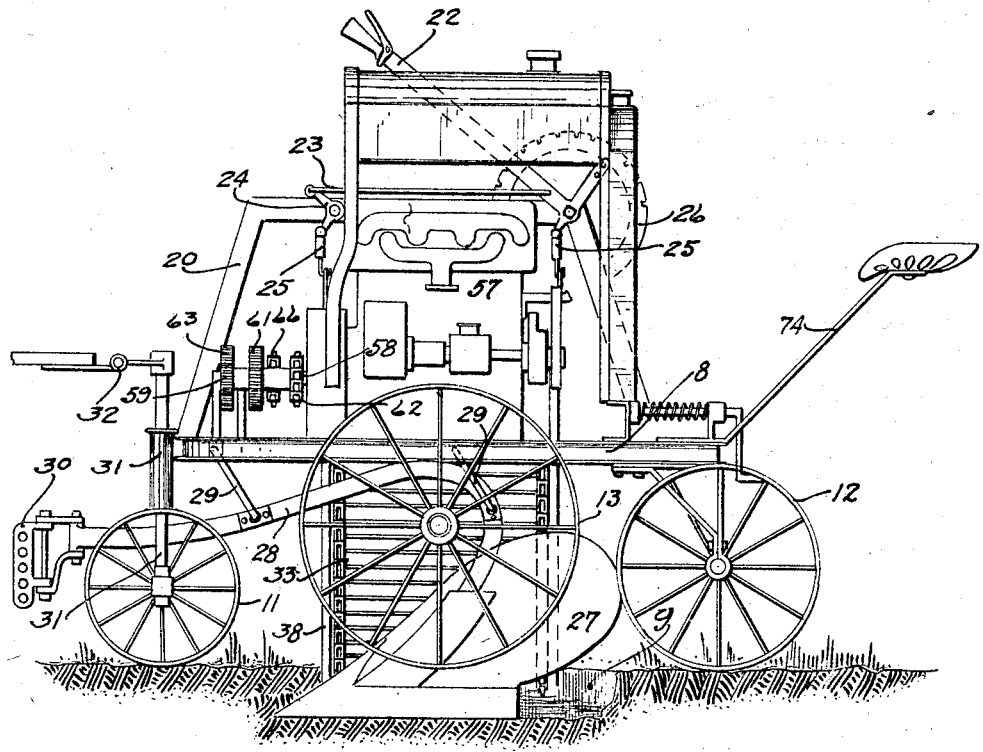
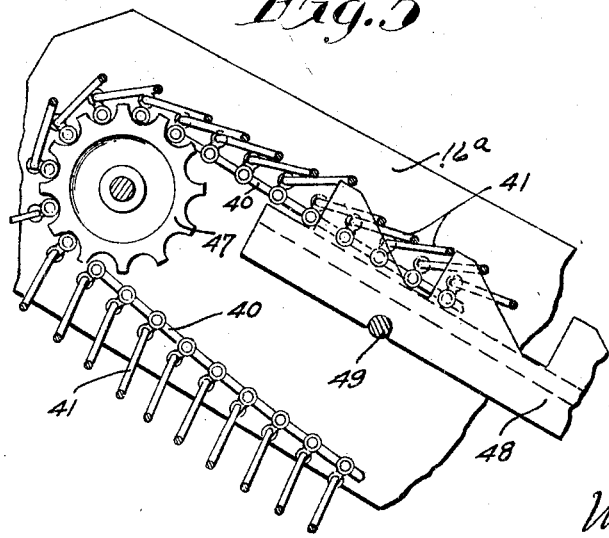
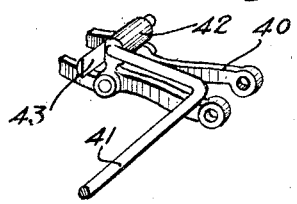

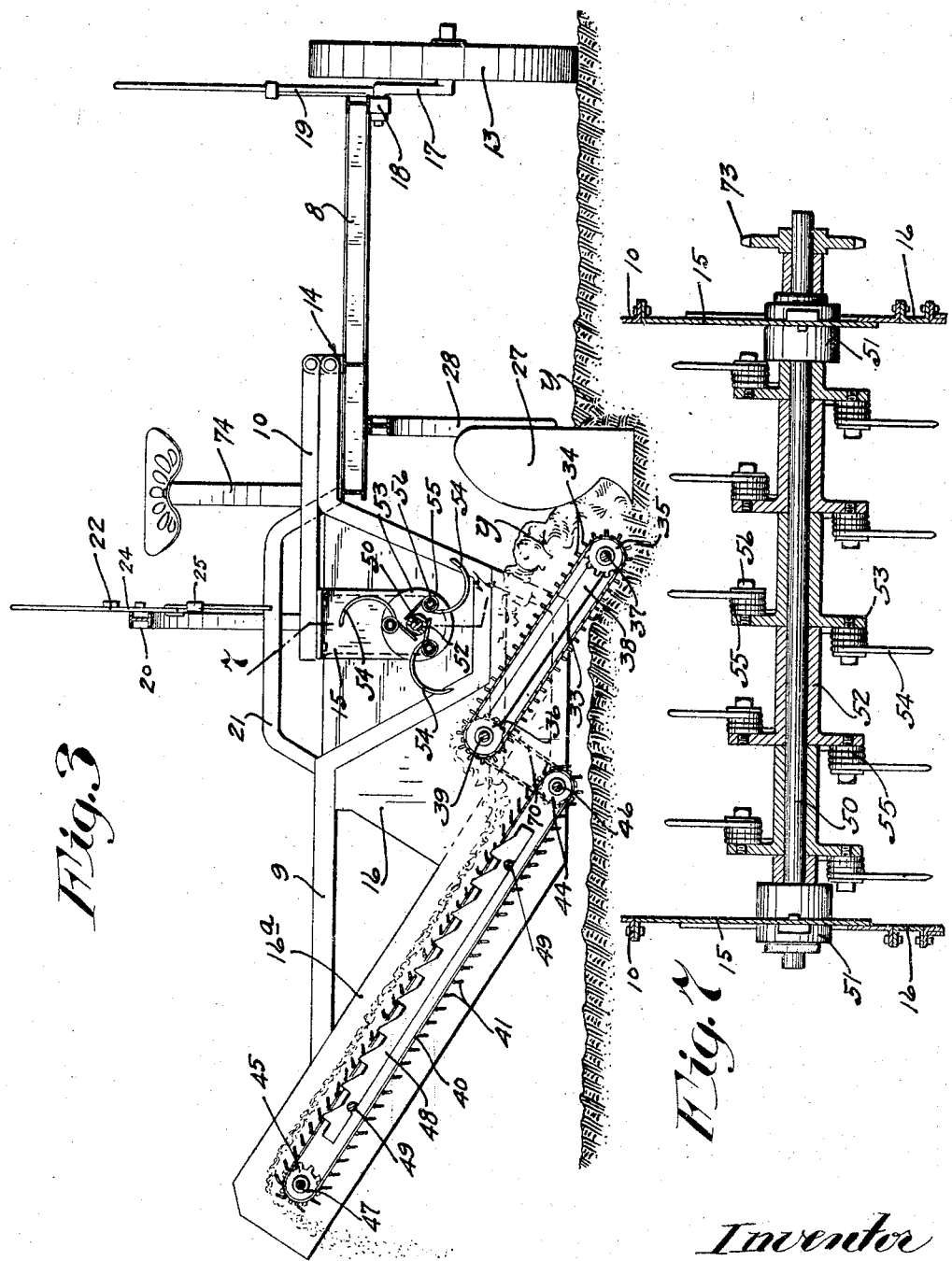

Patented June 14, 1927.

1,632,451

UNITED STATES PATENT OFFICE.

ELMER PITCHER, OF MINNEAPOLIS, MINNESOTA, ASSIGNOR TO PITCHER QUACK GRASS DIGGER CO., OF MINNEAPOLIS, MINNESOTA, A CORPORATION OF MINNESOTA.

QUACK-GRASS DIGGER.

Application filed December 26, 1925. Serial No. 77,747.

My invention has for its primary object the provision of an extremely efficient quack grass digger which, nevertheless, is capable of use for digging and eradicating all kinds of weeds from the soil. As a highly important incidental function the machine will disintegrate and pulverize the soil.

Generally stated, the invention consists of the novel devices and combinations of devices hereinafter described and defined in the claims.

It is a well known fact that quack grass is a very difficult weed to exterminate and that in many places this quack grass has so completely taken possession of the soil that cultivation thereof has become very difficult and the value of many farms has been greatly depreciated by the presence of this tenacious weed. The machine illustrated in the accompanying drawings and which embodies the preferred form of my invention has, in actual practice, been found very satisfactory and highly efficient for the purposes had in view.

Referring to the drawings wherein like characters indicate like parts throughout the several views, Fig. 1 is a plan view of the improved machine;

Fig. 2 is a left side elevation of the machine;

Fig. 3 is a transverse vertical section taken approximately on the line 3—3 of Fig. 1, the engine and certain other parts being removed;

Fig. 4 is a fragmentary perspective showing one of the links and a part of one of the plates of the primary feed belt of the machine;

Fig. 5 is an enlarged fragmentary section on the line 5—5 of Fig. 1;

Fig. 6 is a fragmentary detail in perspective showing a portion of one of the chains and a portion of one of the bars of the secondary feed belt; and Fig. 7 is an enlarged transverse section taken on the line 7—7 of Fig. 3.

The framework of the machine may be treated as involving a main frame 8, a supplemental frame 9, and a beater-carrying frame 10. The main frame 8, as shown, is a rectangular skeleton structure supported by front and rear inside wheels 11—12 and an outside wheel 13. The supplemental frame 9 extends horizontally and laterally from the main frame 8 and is pivotally connected to hinge lugs 14 rigidly secured on the intermediate bar of said main frame. The supplemental frame 9 is made up chiefly of parallel bars that normally rest on the main frame, a considerable distance to the left in respect to Fig. 3 from the hinge lugs 14 so that the downward movement of said supplemental frame is limited to the approximate horizontal position shown in Fig. 3. The top bars of the supplemental frame 9 are depressed at 9$^a$.

The laterally spaced bars of the beater-supporting frame 10 overlie the upper bars of the supplemental frame 9, normally rest thereon, as shown in Fig. 3, and are pivotally connected to the before noted hinge lugs 14. To the ends of the bars of the frame 10 and depending therefrom are secured bearing plates 15 that are given ample clearance by the upper depressions 9$^a$. Rigidly secured to the laterally spaced bars of the supplemental frame 9 are vertical housing plates 16 formed with upwardly and rearwardly extended portions 16$^a$.

The outside wheel 13 is shown as journaled to the crank 17 pivoted to a lug 18 on the outer side of the main frame 8 and made vertically adjustable by a lever 19 of any suitable construction or arrangement.

The main frame 8 has a forwardly and rearwardly extended yoke-like truss bar 20 that extends over the supplemental frame and beater-supporting frame. The side bars of the supplemental frame 9 are provided with raised truss bars 21 that are offset laterally so that they clear the bars of the beater-supporting frame 10. As a means for raising and lowering the supplemental frame on its pivotal connection to the hinge lugs 14, a suitable latch lever 22 is pivoted to the truss bar 20 and is connected by a rod 23 to a pair of bell cranks 24 that are pivoted on the truss bar 20. The lower arms of these bell cranks 24 are connected by links 25 to the truss bars 21 of said supplemental frame. The lever 22 is adapted to be secured in different positions to a latch arch 26 secured on the truss bar 20. One of the bell cranks 24, as shown, is incorporated as a part of the lever 22, (see particularly Fig. 2).

For turning the ground, I use a plow 27, the beam 28 of which is hung from the main frame 8 by parallel links 29 that hold the plow against lateral displacement. The plow beam 28, at its front end, is shown as provided with a clevis that adapts the same to be coupled to a tractor or to a horse-drawn equalizer. The front wheel 11 is journaled on the laterally bent lower end of a steering post 31 journaled in an upright bearing 32 on the front portion of the frame 8. To the upper end of the post 31 is attached a pole 32 or a like device that adapts the same to be coupled to a tractor or to be drawn by horses.

Under advance movement of the machine, the plow 27 will turn the earth $y$, as indicated in Fig. 3 onto the receiving end of a primary conveying belt. This primary conveying belt, as shown in the drawings, is made up of laterally spaced belt chains 33 and metal slats or bars 34, which latter are rigidly secured to flanges 33$^a$ on the links of the two chains. The upper edges of the bars 34 are serrated to form teeth 34$^a$, which, as will hereinafter appear, catch and hold the uplifted quack grass. The chains 33 run over lower sprockets 35 and upper sprockets 36. The lower sprockets 35 are secured on a transverse shaft 37 journaled in the forward portions of oblique bars 38 rigidly secured to the sides of the supplemental frame 9. The upper sprockets 36 are secured on a transverse shaft 39 journaled in the upper ends of the bars 38 and in the sides of the supplemental frame 9.

The primary feed belt delivers onto the receiving end of a secondary feed belt which, as shown in the drawings, is made up of laterally spaced sprocket chains 40 and bail-like transverse slats or bars 41, which latter, at their ends, are pivoted to lugs 42 projected from the links of the chain 40. The lugs 42 are provided with laterally projecting stop portions 43 that limit the oscillatory movements of the bail-like bars 41 and prevent the same from being turned wrong side up while conveying the quack grass or weeds, (see particularly Fig. 6).

The chains 40 run over lower sprockets 44 and upper sprockets 45. The lower sprockets 44 are secured to a transverse shaft 46 journaled in the lower side portions of the supplemental frame 9. The upper sprockets 45 are secured to a transverse shaft 47 journaled in the upper end portions of the side frame extensions 16$^a$.

It will now be observed that both of the conveying belts incline toward the plow and that the delivery end of the primary belt is spaced above the receiving end of the secondary feed belt, so that rocks, lumps of dirt and the like may pass freely to the ground.

As an important feature, the bail-like bars 41 of the secondary feed belt are arranged to be vibrated or shaken up and down as they move from the receiving toward the delivery end of the secondary feed belt. As a simple and efficient way of accomplishing this result, cam bars 48, having saw-like teeth or cam surfaces, are rigidly supported from the side frame structure of the supplemental frame 9 by means of transverse rods 49. These cam bars 48 are set slightly away from the side plates of the frame 9 so that they engage the bail-like bars 41 between the two chains 40.

The beater is a rotary structure carried by a shaft 50 journaled in bearings 51 secured to the lower portions of the bearing plates 15 of the beater-supporting frame 10. As shown, the beater includes a plurality of sleeves 52 rigidly secured on the shaft 50 and provided with disc-like flanges 53. The the flanges 53, curved spring fingers 54 having coiled hub portions 55 are attached by means of machine screws 56 or the like applied to said coiled hubs. The short inner ends of the spring fingers 54 bear against the sleeves 52 to afford abutments against which the spring fingers act.

All of the moving or running parts of the machine are driven from a motor, preferably an internal combustion engine 57 rigidly secured on the main frame 8 and provided with an extended crank shaft 58. A spur pinion 59 is secured to the outer end of the crank shaft 58 and loosely mounted on the exposed portion of said crank shaft is a sleeve 60 that carries a spur gear 61 and a sprocket 62. The numeral 63 indicates a spur gear that meshes with the pinion 59 and is secured to a short countershaft 64 journaled in suitable bearings, not shown, on the frame 8. The shaft 64 carries a spur pinion 65 and a sprocket 66. The pinion 65 meshes with the loose spur gear 61. The pinions 59 and 65 and gears 61 and 63 afford a speed-reducing gear mechanism. The sprocket 62 drives a sprocket chain 67 that runs over a sprocket 68 on one end of the sprocket shaft 39. On the other end of the sprocket shaft 39 is a sprocket 69. A short sprocket chain 70 runs over the sprocket 69 and over a sprocket 71 on one end of the sprocket shaft 46. A sprocket chain 72 runs over the sprocket 66 and over a sprocket 73 on one end of the beater shaft 50. By the sprocket and chain and gear driving mechanism just described, the primary and secondary conveyor belts will be driven at the same or approximately at the same speed or travel and the beater will be rotated at a relatively very much higher speed or rate of peripheral travel.

The numeral 74 indicates a driver's seat shown as applied to the rear portion of the main frame 8 and extended just back of an operator's platform 75.

*Operation.*

When the machine is drawn forward while the engine 57 is in action, the operation will be substantially as follows: The plow will turn a furrow deep enough to dig up the quack grass and will turn the same directly onto the receiving portion of the primary conveyor belt 33. Much of the earth, including small stones, will pass freely between the metal bars 39 of this primary belt and will fall back upon the ground. As the earth is carried upward, it will be subjected to the beating action of the yielding beater fingers 54 and the soil will be disintegrated or finely broken up. The serrated edges 34ª of the bars 34 will catch and hold the quack grass or weeds and carry the same on upward while most of the soil will, as indicated, pass through the primary feed belt. There will be considerable slack in the chains 33 so that the bars 34 will be capable of some oscillation and more or less separation, so as to permit any rocks lodged between the same to work their way through and to the ground. All of the quack grass or weeds with considerable soil adhering thereto and rocks too large to pass between the bars 34 will be delivered by the primary feed belt onto the receiving end of the secondary feed belt. Large rocks will roll back onto the ground through the space between the delivery end of the primary belt and the receiving end of the secondary belt. The quack grass will all be carried upward by the secondary conveyor belt.

As the upper portion of the secondary belt moves upward, its bail-like bars will be repeatedly raised and lowered as they are dragged over the teeth or cam surfaces of the shaker bars 48, and this will have the effect of rattling the soil loose from the weeds and of allowing stones, such as have not passed through the primary belt nor discharged at the delivery end of the latter, to work their way between the crank-like bars 41. Moreover, the movements of the bail-like bars loosen up any stones that may have been lodged between them. The stops 43, (see Fig. 6), prevent the bars 41 from being turned over or upside down during the rattling operation. On the bottom or return portions of the chains 40, the bail-like bars 41 hang freely so that they will not catch or hold rocks passed through the upper portion of the belt.

The plow may be raised and lowered, at will, by any ordinary form of plow-lifting device, not shown. The supplemental frame 9, with the primary and secondary conveyor belts, may be raised and lowered at will by manipulation of the lever 22, and the beater and its frame 10, under normal conditions, will be raised and lowered with the supplemental frame. In case a large rock or a large and hard clump of dirt should be carried upwardly by the primary conveyor belt and thrown against the beater, the latter may freely rise and clear the same and this, as is obvious, avoids breaking of the beater. Moreover, the teeth of the beater are so designed that they will yield or spring backward and not be broken by hard impacts.

What I claim is:

1. In a machine of the kind described, means for turning up the earth and weeds, a primary conveyor receiving the upturned earth and weeds, said primary means having openings permitting the precipitation of the earth therethrough, a secondary conveying means receiving from said primary conveying means and spaced therefrom to permit the downward discharge of large rocks and the like, a rotary beater working over said primary means, and means for imparting vertical shaking movements to the operative portion of the secondary conveying means.

2. In a machine of the kind described, a wheel-supported main frame, a plow associated with said main frame, a supplemental frame connected to said main frame with freedom for vertical rising movements, primary and secondary endless slat and belt conveyors mounted on said supplemental frame, the former receiving from said plow and the latter receiving from said primary conveyor but spaced with its lower end below the delivery end of the latter, a beater frame mounted with freedom for vertical movements in respect to said main and supplemental frames, a rotary beater carried by said beater frame and working above said primary conveyor, and means for driving said primary and secondary conveyors and rotary beater.

3. In a machine of the kind described, a wheel-equipped main frame, a plow associated with said main frame, a supplemental frame connected to said main frame with freedom for vertical movements, primary and secondary endless conveyors mounted on said supplemental frame, the former receiving from said plow and the latter receiving from said primary conveyor but spaced with its lower end below the delivery end of the latter, a beater frame mounted with freedom for vertical movements in respect to said main and supplemental frames, a rotary beater carried by said beater frame and working above said primary conveyor, means for driving said primary and secondary conveyors and rotary beater, and a lifting device connecting said supplemental frame to said main frame, whereby the former may be raised from its normal position in respect to said main frame.

4. In a machine of the kind described, a wheel-supported main frame, a plow connected to said main frame with freedom for vertical adjustments, said main frame at its inner side having a raised forwardly and rearwardly extended bridge bar, a supplemental frame pivotally connected to said main frame and extended laterally therefrom under said bridge bar, a lifting connection between said bridge bar and supplemental frame conveying means mounted on said supplemental frame and receiving the earth and weeds from said plow, and means for driving said conveying means.

5. The structure defined in claim 4 in further combination with a beater frame overlying the receiving portion of said primary feeding means, and means for driving said beater.

6. The structure defined in claim 4 in further combination with a beater frame pivotally connected to said main frame and extended laterally therefrom under said bridge bar, a rotary toothed beater mounted on said beater frame, and means for driving said beater.

7. The structure defined in claim 4 in further combination with a beater frame pivotally connected to said main frame and extended laterally therefrom under said bridge bar, a rotary toothed beater mounted on said beater frame, and means for driving said beater, the downward movement of said supplemental frame and beater being normally limited by said main frame.

In testimony whereof I affix my signature.

ELMER PITCHER.